(12) United States Patent
Lerner

(10) Patent No.: US 10,019,711 B1
(45) Date of Patent: Jul. 10, 2018

(54) PROCESSING OF ONLINE PAYMENT TRANSACTIONS

(71) Applicant: Edward Adam Lerner, San Francisco, CA (US)

(72) Inventor: Edward Adam Lerner, San Francisco, CA (US)

(*) Notice: Subject to any disclaimer, the term of this patent is extended or adjusted under 35 U.S.C. 154(b) by 532 days.

(21) Appl. No.: 14/025,778

(22) Filed: Sep. 12, 2013

Related U.S. Application Data

(60) Provisional application No. 61/700,319, filed on Sep. 12, 2012, provisional application No. 61/819,863, filed on May 6, 2013.

(51) Int. Cl.
*G06Q 20/40* (2012.01)

(52) U.S. Cl.
CPC .................. *G06Q 20/40* (2013.01)

(58) Field of Classification Search
CPC ..................................... G06Q 20/40
USPC ........................................... 705/69
See application file for complete search history.

(56) References Cited

U.S. PATENT DOCUMENTS

| | | |
|---|---|---|
| 5,852,812 A | 12/1998 | Reeder |
| 5,960,411 A | 9/1999 | Hartman et al. |
| 6,016,509 A | 1/2000 | Dedrick |
| 6,119,946 A | 9/2000 | Teicher |
| 6,377,938 B1 | 4/2002 | Block et al. |
| 7,184,989 B2 | 2/2007 | Hansen et al. |
| 7,792,705 B2 | 9/2010 | Bezos et al. |
| 7,827,101 B2 | 11/2010 | Mascavage, III |
| 8,027,918 B2 * | 9/2011 | Nielsen ................ G06Q 20/102 705/38 |
| 8,112,360 B2 | 2/2012 | Burkholder |
| 8,137,193 B1 | 3/2012 | Kelly et al. |
| 8,195,566 B2 | 6/2012 | Tsui et al. |
| 8,359,006 B1 | 1/2013 | Zang et al. |

(Continued)

FOREIGN PATENT DOCUMENTS

WO    WO2011041610    4/2011

OTHER PUBLICATIONS

Manasse, Mark S. "The Millicent protocols for electronic commerce." Proceedings of the First USENIX Workshop on Electronic Commerce. vol. 7. 1995. 6 pages.

Stewart, D. "The Future of Digital Cash on the Internet." Journal of Internet Banking and Commerce 2.3 (1997). 6 pages. Accessed online Jul. 29, 2014 from: http://www.arraydev.com/commerce/jibc/9703-02.htm.

(Continued)

*Primary Examiner* — Jessica Lemieux
(74) *Attorney, Agent, or Firm* — Carr & Ferrell LLP

(57) ABSTRACT

Computer-implemented methods and systems for processing of online payment transactions are provided. An example method comprises registering a merchant with a payment service to create a merchant account and registering a user with the payment service to create a user account. The merchant can registers an entitlement with the payment service to receive a payment service entitlement identifier. A payment request associated with the entitlement is received from a user. The payment request includes the entitlement identifier associated with the payment service or with the merchant and a payment amount. A database is queried to validate the entitlement identifier and a price and, upon successful validation, the user account is credited with purchasing the entitlement, and the payment amount is transferred from the user account to the merchant account.

16 Claims, 8 Drawing Sheets

(56) References Cited

U.S. PATENT DOCUMENTS

| | | | |
|---|---|---|---|
| 8,521,650 B2* | 8/2013 | Rodov | G06Q 30/02 |
| | | | 705/51 |
| 2002/0103021 A1* | 8/2002 | Wood | G07F 17/3293 |
| | | | 463/23 |
| 2002/0111907 A1* | 8/2002 | Ling | G06Q 20/04 |
| | | | 705/41 |
| 2003/0055780 A1 | 3/2003 | Hansen et al. | |
| 2003/0154164 A1 | 8/2003 | Mascavage, III et al. | |
| 2004/0139008 A1 | 7/2004 | Mascavage, III | |
| 2004/0210529 A1 | 10/2004 | Wu | |
| 2009/0132416 A1 | 5/2009 | Titus et al. | |
| 2009/0271287 A1 | 10/2009 | Halpern | |
| 2010/0010915 A1 | 1/2010 | Shea et al. | |
| 2012/0015743 A1 | 1/2012 | Lam et al. | |
| 2012/0016796 A1 | 1/2012 | Driemeyer et al. | |
| 2012/0130853 A1 | 5/2012 | Petri et al. | |
| 2012/0316947 A1 | 12/2012 | Quinlan | |
| 2016/0342537 A1 | 11/2016 | Hulbert et al. | |

OTHER PUBLICATIONS

Aslam, Taimur. "Protocols for E-Commerce. Paving the way for electronic business." Dr. Dobb's Journal. Dec. 1998. 10 pages. Accessed online Jul. 29, 2014 from: http://www.piclist.com/techref/article/ddj/no292p58.htm.

"Playspan. Commerce." Company website. 2 pages. Accessed online Jul. 29, 2014 from: http://corp.playspan.com/microtransactions.

* cited by examiner

500

How big is your Thank You?

PROCESSING OF ONLINE PAYMENT TRANSACTIONS

CROSS-REFERENCE TO RELATED APPLICATIONS

The present utility patent application is related to and claims priority benefit of the U.S. provisional application No. 61/700,319, filed on Sep. 12, 2012, and No. 61/819,863, filed on May 6, 2013, under 35 U.S.C. 119(e). The contents of these related provisional applications are incorporated herein by reference.

TECHNICAL FIELD

This disclosure relates generally to data processing, and more specifically to methods and systems for processing of online payment transactions.

BACKGROUND

Electronic commerce, commonly known as eCommerce, is a type of industry where the buying and selling of products or services is conducted over electronic systems such as the Internet and other computer networks. Electronic commerce draws on technologies such as mobile commerce, electronic funds transfer, supply chain management, Internet marketing, online transaction processing, inventory management systems, and automated data collection systems.

To satisfy the needs of eCommerce, new payment systems have been created to facilitate the acceptance of electronic payment for online transactions. These payment systems have become increasingly popular due to the widespread use of the internet-based shopping and banking. However, traditional eCommerce payment systems are not well equipped to process frequent payments due to their inability to keep costs for individual transactions low. Additionally, traditional eCommerce payment systems require verifications for each transaction, making the process very inconvenient for users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with one embodiment of the disclosure, a system for electronic payment is provided. The system may comprise a processor and a database. The processor may be configured to register a content or service provider with a payment service to create a merchant account within the payment service. Additionally, the processor may be configured to register a user with the payment service to create a user account. The payment service may be associated with a private or virtual currency, which may help prevent fraud and overcome regulatory restrictions associated with public currencies. The merchant may request unique identifiers associated with certain entitlements to use or access specific content or services of the merchant. The entitlement identifier may be associated with a file name, a Uniform Resource Locator (URL), sections of content, or other identifying characteristics. A payment request associated with the entitlement and including the entitlement identifier and a payment amount may be received from a user. The request may be sent to a database to verify that the entitlement identifier exists and the user has not already purchased the entitlement. If not, the payment amount may be transferred from the user account to the merchant account, and the entitlement may be added to the user account.

In some embodiments, the payment request may be received in response to activation of the private currency (e.g., a digital coin) associated with the content. The activation may include touching, pinching, clicking, flicking, dragging, and/or dropping of the digital coin, or pressing a key. Additionally, the activation of the digital coin may be accompanied by one or more of the following events: an audio, an animated graphics, an animated video, or haptic feedback.

The payment may allow users to: remove a banner ad from a website, continue reading a newspaper article, skip a commercial, remove clutter, donate to a cause, unlock an item in an online game, access an additional feature, access a paywalled content, trigger an event, access a digital object, write a comment or annotation, send a message to an author, send a copy to a contact, get first or early access, vote for or improve ranking of a digital object, mark a favorite object, save a digital object, get access to additional information, and so forth. Thus, the present disclosure provides a useful tool for processing of online payment transactions and receiving income associated with online entitlements (granting of rights).

To the accomplishment of the foregoing and related ends, the one or more embodiments comprise the features hereinafter fully described and particularly pointed out in the claims. The following description and the drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
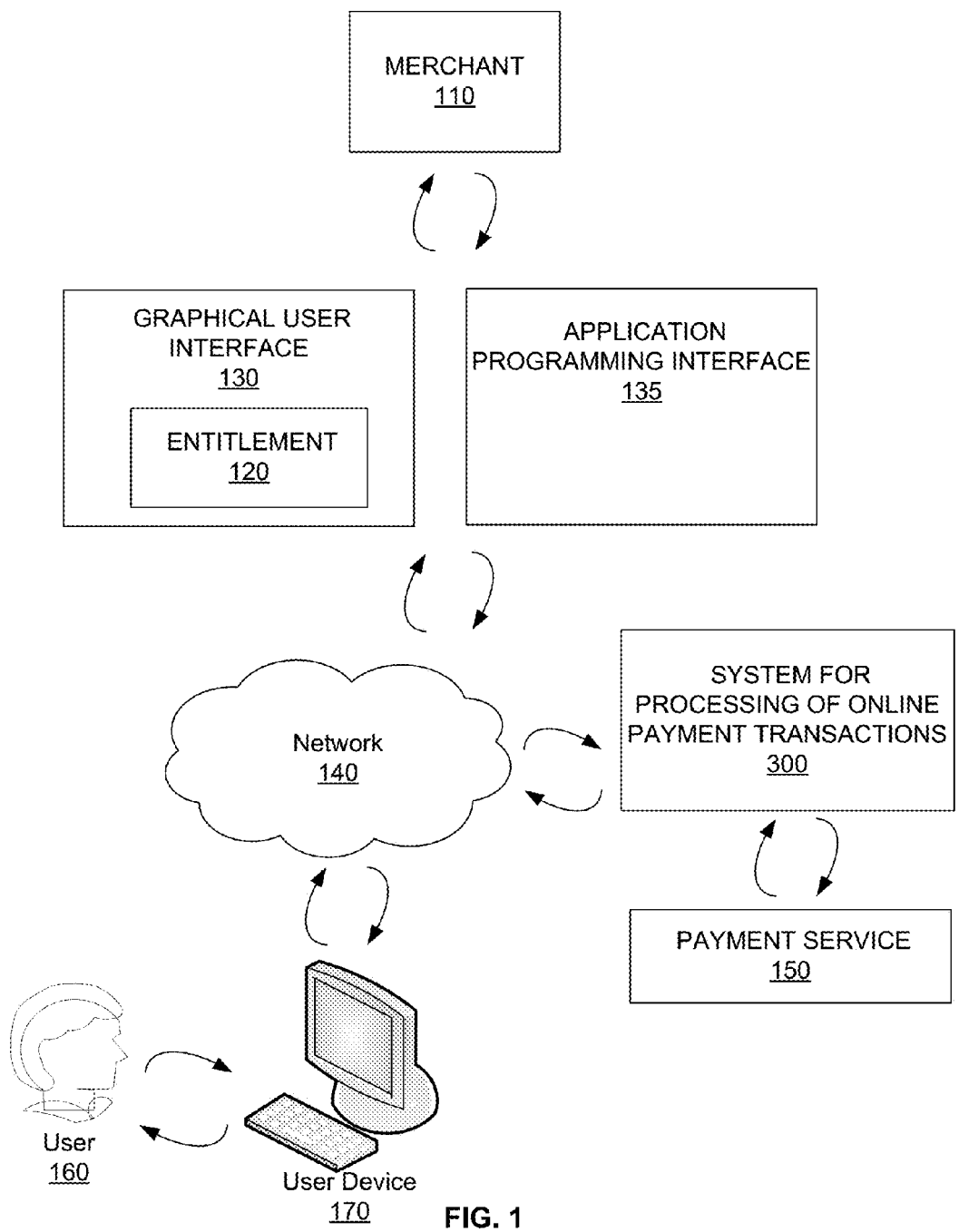
FIG. 1 is a block diagram showing an environment within which a method and system for processing online payment transactions can be implemented, in accordance with an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The approaches and principles disclosed herein relate to computer-implemented methods and systems for processing of online payment transactions using a payment service. The payment service may be associated with a private digital currency and may enable merchants to increase their revenue associated with the content or services provided online. The increase in the revenue may result from the possibility of transferring certain amounts in the digital currency nearly instantly and effortlessly.

An entitlement identifier may be provided embedded in a web resource associated with the provided entitlement. Alternatively, the entitlement identifier may be embedded in a web page, a browser or browser toolbar, an application, a piece of digital content, a digital movie, or a digital document accommodating the content, content management system or database. A user may easily trigger a payment from the user account on the payment service to the merchant account on the payment service via a GUI associated with the web resource. The payment may be made by activation of a digital coin associated with the content. The activation may be implemented through touching, pinching, clicking, flicking, dragging, and/or dropping of the digital coin represented by the GUI, or pressing a key.

The methods and systems for processing of online payment transactions using a payment service simplify the user interface and make payments more user-friendly and intuitive. Conventional systems, whether based on cash, credit cards, or even stored value, are cumbersome and time-consuming, as they require a user to verify identity and go through several steps before a payment can be transferred. The disclosed systems and methods for processing of online payment transactions enable a visitor of a website or application user to make a small payment, drop a "Coin," to a merchant (online content or service provider) with a simple click and drag of a mouse, a swipe of a finger, or using a key (for instance the $ key). Additionally, because the disclosed system and methods do not require immediate verification of all parties involved (as the sums of money from any individual user may be small), the process of payment is streamlined and much quicker than conventional process, thus giving further incentive for a user to make a payment.

The systems and methods described herein may also allow a user to make a payment for an entitlement that is already provided on the Internet for free. Users have an easy way to pay social debts (like giving Wikipedia a quarter for a really helpful article), pay to remove annoying banner ads from websites, or even pay to continue reading a newspaper article. Since the amounts in question are quite small, the disclosed system operates much like the impulse-buy section of a grocery store.

Additionally, the current disclosure provides a way for merchants, website owners, and others who provide content or services on the Internet to generate additional revenue without having to significantly modify their websites or applications. These merchants do not have to verify user information and only have to register with the payment service, and, if necessary, verify that the entitlement provided to users is their own, and then collect user payments via the payment service.

In consideration for a payment the user may receive an entitlement to perform certain actions with the provided content. Thus, on making a payment, the user may be able to view the content or use the service without advertisements or clutter. Payments, perhaps small, may enable users to skip creating an account, get access to content (get access to read an article, view video, or listen to audio), or the user may thus make a donation to the merchant as a gratitude for providing the content (giving Wikipedia or other socially created websites a small sum of money for a really helpful article).

Conventional systems (whether based on cash, credit cards or even stored value cards) may be inconvenient since money transfers are secured before goods are transferred. When a payment is made to access entitlements, access is blocked until all financial validation and checks are performed. In contrast, the system for processing of online payment transactions described herein responds after a simple database query to determine if the user has enough funds to perform the transaction, and if the user is not restricted from the transaction due to age, location, and so forth. Full financial validation may be performed in rare occasions where it may be necessary, for instance when an account is funded. The reduction of validation steps at every transaction makes the system for processing of online payment transactions a very lightweight, fast, and scalable (to billions of tiny transactions).

In some embodiments, the merchant designated to receive the payment may be associated with an URL or another unique identifier either embedded into the content itself, or the container of the content, or content database or management system, or otherwise associated with the entitlement identifier. The system for processing of online payment transactions may keep the user anonymous, or report the name or other contact info to the merchant (perhaps at the discretion of the user), or report a unique identifier of the user so that if later problems came up the user could be refunded. The user identifier could be global—the same across many merchants, or local—specific to a merchant.

The use of the system for processing of online payment transactions may allow real-time control over content and applications. For example, the system for processing of online payment transactions may enable a user, while viewing an ad, to click on a 'pay to remove ads' button (or key) to remove that ad in real time, without going to any purchase or store screens. The system for processing of online payment transactions may also allow unlocking a digital object in real time in a game, for instance, to unlock a door to access additional cost parts or areas of that game with a simple 'door opening gesture' like a clockwise twist, or a click on the door, or by gesturing/clicking to unlock. Alternatively, a buyer may get a permission to read an article or a part of the article, in real time by clicking on a corresponding pay (to read) button or by clicking on the virtual coins nearest the article. This real time event may be associated with a payment, either immediately, or the payment may be delayed or otherwise accrued.

FIG. 1 is a block diagram showing an example environment 100 within which a method and system for processing of online payment transactions can be implemented. The example environment 100 may include a merchant 110, entitlement 120, a graphical user interface 130, and an application programming interface 135. The graphical user interface 130 and application programming interface 135 may be associated with a system for processing of online payment transactions 300 enabling nearly instant payments in a private and/or public currency associated with a payment service 150. The graphical user interface 130 is for communicating with individuals, whereas the application programming interface 135 is for communicating with computers. A user 160 may access an online resource associated with the entitlement 120, via a network 140, through a user device 170.

The network 140 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 140 may be a network of data processing nodes that are interconnected for the purpose of data communication.

The user device 170 may include a mobile telephone, a computer, a lap top, a smart phone, a tablet PC, and so forth. The user 160, in some example embodiments, may be a person interacting with the graphical user interface (GUI) 130 via one of the user devices 170. The user 160 may be registered with the system for processing of online payment transactions 300 and have information on available amounts in the private currency stored in a database of the system for processing of an online payment transaction 300.

The use of private or virtual currency (coins or bills) to, temporarily or permanently, skip some or all ads, to remove annoying banner ads, logos, tickers, side bars, or other clutter that is extraneous to the content or service of interest, and instead to be presented with a cleaner, perhaps ad-free layout, to get granted access to view or download digital objects or files for later consumption, to be granted access to write comments or annotations (perhaps without logging in) about or for a digital object like an online video, picture, blog, website, photo, digital document, to send a message to (otherwise inaccessible) author, to prioritize an item like a comment, to send a copy (or an initial portion) of an otherwise inaccessible article, document, object or webpage to a friend or contact, to access to a digital object, to vote or raise the position or ranking of a digital object, to mark favorite or least favorite lines or portions, to file or save a digital object, to get access to additional information like additional pictures or notes or a 'director's cut', to get temporary or limited access to objects or services behind a 'pay wall', and so forth.

Furthermore, in many cases users or buyers may prefer to remain anonymous. In the real world, anonymity can be enabled in transactions by the use of cash. However, in the Internet world anonymity is harder to come by. There is no true equivalent of cash. True user anonymity also has a drawback. Once a transaction is made it is impossible to track down the user in order to give him a refund, to provide certain information to customer service in case the user needs help, or to have that transaction carry over in any way, say to provide access to information beyond that browsing session. It is also impossible to verify that the user meets certain eligibility requirements, for example, age 18, or located in the USA. For example, a user is gambling on a gambling site and wants to remain anonymous. This would not be possible as the user may have to prove that he is over the age of 18 or located in an area that allows gambling.

To overcome this difficulty, an identity service, typically, in conjunction with a payment service may be used. The identity service may prove age, residence, location, uniqueness, ability to pay, or otherwise confirm that the user is a legitimate and qualified customer. When a less than fully anonymous user arrives at a site or application of a merchant, the merchant may query the identity/payment service to check if this user is allowed to access the content. If found to not be acceptable, the user may be blocked from the site or application, and may be provided with the reason for the block. If found to be acceptable, the user may be allowed in, perhaps with some restrictions like a credit limit or age restrictions.

The identity service provider may provide to the site or application a unique user identifier that is only valid on that site or that application. The identity service may work across multiple sessions, times and dates, or be limited by times and dates. When the user attempts to make charges or the website attempts to bill the user, the identity provider may act as a middleman, restricting the information so that anonymity is preserved and yet the transaction is tracked and if necessary, reversible. Even with Internet services and applications that have no apparent need for anonymity, many users do not wish to be contacted or notified after the fact, for example, by some spam-like email.

Providing the users with the privilege to remain anonymous, and yet have their transactions supported, may be a valuable service for many users. For instance, instead of having to log into the local newspaper site with your user name, thus running the risk of getting spammed at a future date, a user could instead pay a small amount, say $0.10 to use an identify provider to grant him an approved but anonymous log in. The identify provider might then only share with the newspaper that they should allow access to a payment verified but otherwise anonymous user, or it might also share age and location, as some content is restricted by either age or location. Many sites or applications that use CAPTCHAs may be able to allow users to substitute CAPTCHAs for a small payment.

Figure 2:
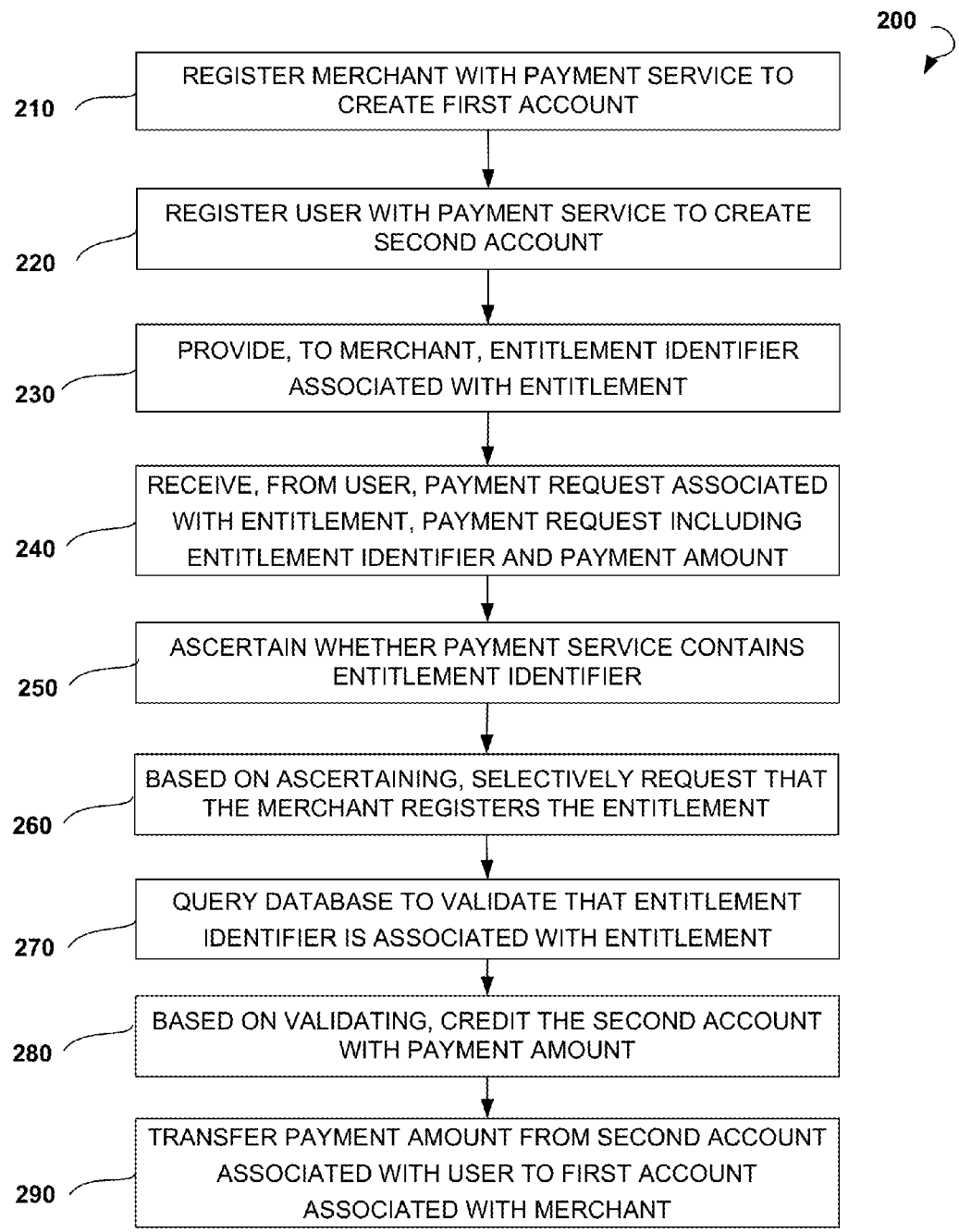
FIG. 2 shows a flow chart of a method for processing online payment transactions, in accordance with some example embodiments.

FIG. 2 shows a flow chart of a method 200 for processing of an online payment transaction using a payment service. The method 200 may be performed by processing logic that may comprise hardware (e.g., dedicated logic, programmable logic, and microcode), software (such as computer code executable on a general-purpose computer system or a specifically configured computer system), or a combination of both. In one example embodiment, the processing logic resides at the system 300 illustrated in FIG. 3. The method 200 may be performed by the various modules discussed above with reference to FIG. 3. Each of these modules may comprise processing logic.

As shown in FIG. 2, the method 200 may commence at operation 210 with registering a merchant with a payment service to create a first account (merchant account) and registering a user to create a second account (user account) at operation 220. To mitigate delays, excess fees, and legal restrictions on monetary transactions, the system 300 may use a private or virtual currency instead of a direct payment method.

While public digital currency may be defined as a form of digital payment that is acceptable by as many merchants as possible, a private digital currency may be defined as a form of payment that is only accepted by a single product, single merchant, or an affiliated group of products or merchants. A prepaid Visa card is a type of public digital currency. A game virtual currency or a Target gift card is a type of private digital currency.

A digital currency is akin to a stored value account except that it may be restricted from use for money transfer, purchases of 'real' goods or services and other physical purchases, so that it may avoid restrictions on 'real money' transactions. It is also much simpler and faster to access a stored value, than go through a rigorous payment validation like accessing a bank account or credit card. The prepaid nature of the stored value card may also minimize the chance of payment issues. In effect, by prepaying into a digital currency, many of the barriers of real time payment validation may be removed.

When registering the first account, the merchant may setup information such as their bank account or payment details, reporting preferences, and so forth. In return, the merchant may receive a key or keys that allow the merchant to collect and convert the credits received into actual payments.

At operation 230, the merchant may be provided with an entitlement identifier (i.e. a key) associated with certain entitlements (rights to access or use certain goods or services). The entitlement identifier may be embedded in the content, a container of the content, data identifying an entitlement, a web page, a browser or browser toolbar, an application, in a piece of digital content, a digital movie, a digital document, database, content management system and so forth. The entitlement may be associated with a Uniform Resource Locator (URL), file name, or other identifying characteristics.

At operation 240, a payment request associated with the entitlement may be received from a user. The payment request may be initiated via a graphical user interface that may be provided together with the purchasable content or service. For user convenience, sending the payment request may be visualized. For example, the user may make a payment by clicking on an image of a coin.

In some embodiments, the user may spend a "Coin" by clicking on it. The Coins may have different values, such as 1, 5, 10, 25, 50 or 100 USA cents, or in denominations of other currencies' coins or bills. Each Coin click may trigger JavaScript or other procedures that, if the user had Coins to spend, plays a coin drop effect or animation. If a user has not signed up for the payment service and attempts to pay, the user may be prompted to supply his credentials, for example, an email address and password. After the user validates his credentials, he or she may receive a small sum of Coin. When the user returns from this interruption, he may see and hear the coin drop effect on the website or application that the user was formerly viewing and indicated his intention to give a Coin to. The drop effect may vary depending on the Coin denomination. Each coin click may cause the payment request to be sent to the system 300.

On the second and subsequent Coin drop by the user, he may see/hear a Coin effect or coin drop. However, at some point, the user will run out of Coin and be requested to pay for an additional amount of Coin. In certain embodiments, the user may be limited to how much he can 'charge' or deposit into his account to increase the level of safety of the system.

The user may view his complete history of his Coin debits and credits, somewhat analogous to a phone bill. The report may be simple or may include such data as what date/time (local) coins were spent, where were coins were spent (that is which entitlements at which merchants), appropriate links, amount spent, and so forth. More info might also be available including the user's location/machine, OS/Browser/Plugin-App, and Transaction ID. The user may be sent a monthly statement via email or other messaging service.

In certain embodiments, users may wish to brag or inform others when who he spends Coin, and thus may have the Coin payments trigger social media events regarding the purchases and so these can be linked to social media actions, such as Likes, Tweets, and so forth.

Additionally, users may receive bonuses or other perks for informing or bragging to others about their purchases or successfully referring friends or others to participate in the online payment method and system.

In certain embodiments, the method may optionally include playing audio, animated graphics or video, vibration, or haptic feedback when payments are either sent or received. The sound/visual effect may be related to the amount of the transaction. For example, a $1 payment might sound/look like four consecutive quarter drops or it might have a nice sound and visual effect. This effect might reflect the size of the transaction, perhaps with some random or algorithmic variance. This effect could be triggered whenever the user spends or moves money, to make a gift, pay for something, to fill a stored value account, even when an automatic payment was made.

Coins or bills may not simply represent the price of an object, but also may be activated to make a payment. The activation may be made, for example, by touching, pinching, clicking, flicking or other gestures, or drag and dropping to a slot, receptacle like a piggy bank, and so forth. If there is only one possible transaction possible with the Coin, then activating the simulated currency may initiate that transaction. If there are several possible transactions, then a first gesture may indicate which transaction is desired and then activating the currency will trigger that transaction.

Alternatively, in some embodiments, the Coin may be activated first, and then 'spent' as soon as the specific transaction is marked by the user. This may be done either to fund an account to the use funds from an account, or to transfer to or from a second account.

In certain embodiments, the graphical user interface may be part of a web page, application, browser or browser toolbar, or other location on the screen, or as a library within an application. The currency provider may follow the preferred currency choice of the user. Thus, a transaction might use an image of an American Dime, a Canadian Dime, or 10 yen coin as appropriate to the amount of the transaction and preferred currency. Alternatively, the currency provider may allow use of a 'made up' currency like Facebook credits, Fantasy world copper pennies, or a store or provider branded currency like Green Stamps.

In some embodiments, a user of Coin may use Coins to skip ads, to access digital objects, or portions of digital objects, to write comments or annotations, to send a message to the author, to send a copy (or portion) of content to a friend or contact, to get access, to vote or raise the position or ranking of a digital object, to mark favorite lines or portions, to file or save a digital object, to get access to additional information or a 'director's cut," to user online services and so forth.

The provided method 200 may further allow for safe payments for non-tangible goods. With intangible goods, particularly the ones already available for free (via Ads), a less rigorous and therefore more pleasant point of purchase experience is possible. In specific instead of forcing a full payment validation to spend a small amount to access some Internet content or service, the system 300 may perform a simple valid account check and then bill the user later. This could allow access even if the user had no money in their account. The user may check the transaction or 'fill up' his account when convenient. The system 300 may also record various bits of information to aid the user in auditing his or her bill.

Back to FIG. 2, at operation 250, on receiving the payment request, the system 300 may ascertain whether the payment service contains the entitlement identifier included in the payment request. If the payment service does not have the entitlement identifier registered, the system 300, at operation 260, may request that the merchant registers the entitlement, so that an entitlement was assigned an entitlement identifier.

At operation 270, a database may be queried to validate that the entitlement identifier in the payment request is associated with the content. Upon successful validation, at operation 280, the second account may be credited with the payment amount, and the payment amount may be transferred from the second account associated with the user to the first account associated with the merchant at operation 290. Alternatively, in some cases merchants may pay users with a reversed flow of payments.

A successful payment may be represented via the GUI or other means by visual, sound, and/or haptic effects. For example, the selling may be represented by coin drop sound. In some embodiments, the effects may vary depending on the amount, that is the bigger the amount the more coins or the longer the coin drop sound, and the like.

In order for the methods and systems of online payment to operate and maintain operations, the service may charge a fee on all Coin transactions when the merchant "cashes in" the Coins that the merchant has received.

Once a merchant proves he owns a URL (typically by placing his merchant key into that area) or entitlements are sold associated with that merchant, the merchant may start receiving payments (including back payments). Payments to merchants may be deferred until there is sufficient time to allow users to review one or more monthly statements, and if necessary report fraud by merchants. As the system aggregates payments from potentially millions of customers each with many small transactions, merchants are insulated from the complexity and cost of directly interacting with a large number of small customers by the payment service.

If a user donates Coin for content or services, but the owner of the merchant cannot be identified, then the payment can be help for a period of time to find the owner, or could go either to a good cause (e.g. a charity), specified by either the user or the payment service, or could refunded back to the user. The merchant could positively identify oneself by modifying content or service HTML, MX record, inserting a watermark or other similar method.

Unlike traditional payment methods, the merchant can also restrict entitlement purchases to certain users, for instance restricting purchases to users of certain ages or locations, or who have signed certain end user agreements.

Another embodiment of the disclosure is an API for apps, and a cruder, non-JavaScript URL (and URL shortened version) to enable and encourage payments from users who are posting hyperlinks in forums, in wikis, in comments, and so forth.

In certain embodiments, three kinds of coins may be used: full coins, loaned coins, and test coins. Full coins may be normal units of payment. Loaned coins may be designed so that new users may be provided with some bonus Coins for free, in return for signing up to the payment service, say $1 worth of Coins. Unlike real coins, payment on loan coins may be deferred until there is enough real Coin paid to a merchant to repay the loaned coins. For example, if for each $1 in real coins a site collects, the payment provider repays $0.10 in previously loaned coins, so that is $100 in real coins can pay off $10 in loaned coins. Test coins are for testing and have no value. The terms of use of the payment service may specify how many test coins a merchant must accept.

Additionally, various spending reports may be provided to merchants, including distinguishing between test, loaned and full coins, IP address, transaction time stamps, entitlement identifier, language, browser (or app, or plug in, or even bookmark), or a 'blank' block of data the merchants can send to the payment service with each transaction.

Coin purchasers may be anonymous or be accompanied by a user identifier, which may be specific to that merchant. This user identifier may be used to provide refunds to unsatisfied customers when necessary.

Merchants may also supply to the payment provider various identifiers with each Coin acceptance so they can track various transactions.

In some embodiments, the amount that may be transferred in one operation may be limited to reduce the incentive for fraud, or reduce the risk of the user. For example, the buyer may make a maximum payment of one dollar at a time.

Figure 3:
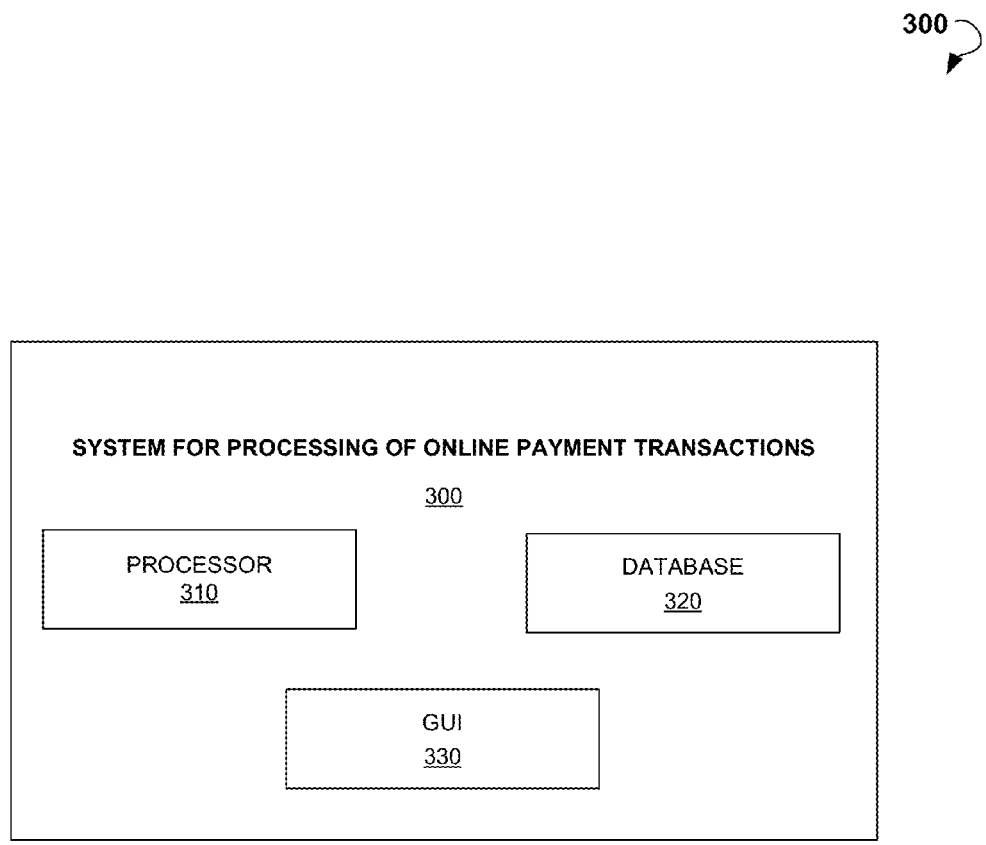
FIG. 3 shows a detailed block diagram of the system for processing online payment transactions, in accordance with an example embodiment.

FIG. 3 shows a detailed block diagram of the system for processing of online payment transactions, in accordance with an example embodiment. The system 300 may include a processor 310, a database 320, and, optionally, a GUI 330. The processor 310 may be configured to register a merchant (provider of content or services) with a payment service to create a merchant account and to register a user to create a user account. When required, the processor may provide entitlement identifiers and prices for their content or services. Data associated with the merchant account and their content or services and the user account may be stored in the database 320. A payment request to pay for an entitlement may be received by the processor. The payment request may specify the entitlement identifier for the entitlement and a payment amount. A query may be sent to the database 320 to validate the entitlement identifier, and, upon successfully validation, the payment amount may be transferred from the account of the user to the account of the merchant in the payment service, and the user may be credited with purchasing that entitlement.

Payment request sending and successful execution of a payment may be visualized or otherwise represented via the GUI 330. For example, the GUI 330 may provide audio, animated graphics, or video. Additionally, vibration, haptic, or other similar feedback can be provided in response to a payment or some commitment to a future payment, either sent or received. The sound/visual effect may correspond to the amount of the transaction. For instance, a $1 payment might sound/look like four consecutive quarter drops or it might have a fun sound and visual FX, but not as impressive as the FX for a $5 payment. The feedback may directly reflect the size the transaction, so $2 would provide longer or bigger feedback than $1, and $0.50 would be shorter or smaller. The feedback may simulate using real coins, so each dime, quarter or dollar spent would show/sound with the feedback appropriate for that number and type of coins. This feedback acts as a safety feature, making it unlikely that people spend or receive money without realizing it. This allows the removal of user-check screens (the "are you sure?" screen).

The 'auditing feedback' may also be accompanied by a 'reward' animation or sound, that would not necessarily reflect the amount of the transaction, just what the transaction designer thought was appropriate for that action. For instance, if a user gave a gift to a charity he might want a "thank you" animation and sound to play. The feedback may be provided whenever the user agrees to pay for a service or thing, make a gift, transfer money or other value, or add value to a stored value account, even when an automatic payment was made.

In certain embodiments, the system may allow the use of a fast online payment service to enable real-time control over content and applications. For example, a user, while viewing an ad, may click on a pay or remove button or key to remove that ad in real-time. Alternatively, the user may unlock in real time (with one gesture or click) an object in an online game, perhaps a door to access additional parts of that game, or use other real time payments to quickly access a website, concert, book, etc., or to get near instant access to content normally pay walled, by interacting with an appropriate interface element, for instance a button labeled $1. Any real time event may be associated with a fast payment mechanism, even if the payment to the merchant is actually delayed or otherwise accrued.

The system may allow the use of digital currency for a more meaningful 'liking', voting, rating or placing values on URLs or any other uniquely identified object than simply voting or liking without any cost; that is, it may be more meaningful to show a site collected 100 $0.01 tips than 1000 free likes. For instance, the system may allow a user to place a virtual Coin into a virtual coin jar to vote on something or to 'real like' something. Also optionally users can be limited to 'voting' with payments, say a $0.01 limit per user. Those votes could be positive or negative, that is a user may vote to support something or vote to express displeasure.

In other embodiments, a user may spend his digital currency as a means to authenticate with a website or another system that requires authentication. The user may spend currency to allow him to sign in, get access, vote, or perform other actions. For example, the user may pay a fee instead of signing into a site with a username password or other combination, to get access to a site by spending some real or digital currency on that site, the amount to be determined by that site.

In certain embodiments, a merchant could be provided with user information regarding what entitlements users on his websites or applications bought, via the payment service. For example, these records might show if a merchant noticed that at least 75% of the money he was generating came from people visiting his site and paying to access articles related to breaking financial news.

Figure 4:
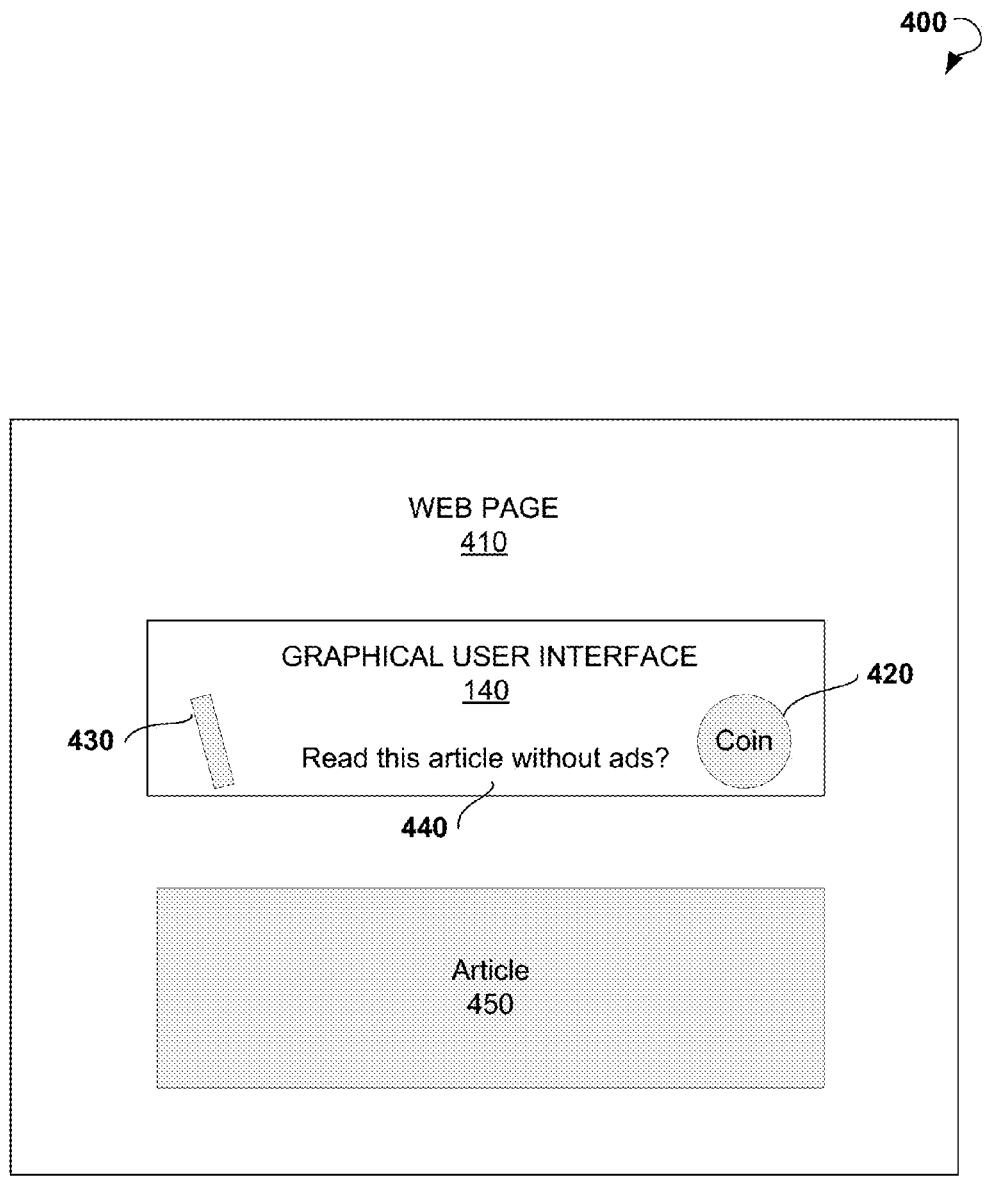
FIG. 4 illustrates an example graphical user interface for activation of a virtual tender associated with a private currency, in accordance with an example embodiment.

An example web page 410, embedded content (article 450), and GUI 140 to perform online payments are illustrated in FIG. 4. The user may access the web page 410 associated with the merchant. The GUI may provide a message 440 associated with the content and payment visualization elements, such as a coin 420 and a slot 430. To send a payment request, the user may, for example, place the coin 420 into the coin slot 430 using an input device, such as a computer mouse, a touch screen interface, or other means. When the payment is performed, the user may be granted the entitlement to view the article without any advertisements. Accordingly, the advertisements in the article 450 may be hidden.

Figure 5:
FIG. 5 illustrates an example interface for donations, in accordance with some example embodiments.
Figure 5:
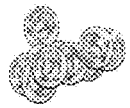
Figure 5:
Figure 5:

Additionally, the system 300 may be used for donations or discretionary payments as shown in FIG. 5. An example interface 500 for making donations may be associated with some web providing online content, receiving contributions, and so forth. The interface 500 may include a donation amount that may be modified by the user and a Donate button. On clicking the Donate button, the corresponding amount may be transferred from the user account to the account associated with the merchant. Thus, the system 300 allows making rapid payments and donations and keeping record of the payments and associated entitlements.

Additionally, it is often desirable to allow users to try goods or services offered online risk free. Conventional one-click payment schemes do not offer the user a chance to verify that his click was not an accident, or a way to select a payment method. This would require additional clicks. They do not offer the user a way to select a shipping address and method. Sloppy or dangerous website may charge a user account without that user's knowledge (as there is no additional verification after the click, and it may be possible for the website to simulate a click without the user's permission or knowledge). There are a variety of laws governing transactions that restrict what is and is not allowed in a transaction. For instance, certain content cannot be offered in certain locations. Potentially there may be a significant increase in transaction fees if each transaction must be processed quickly (as potential financial problems must be exposed quickly) and independently (as each transaction may be separate). Thus, existing one-click systems, instead of processing a 'shopping cart' worth of transactions (say $20) with one overhead fee (say $0.30+3%)=$0.90 fee the system, may process each individual transaction (say 20 $1 transactions, or 20*($0.03+$0.30)=$6.60 fee, a 700% increase in fees. In addition, there can be a second or more delay between the user clicking and verifying if the payment is valid. This can lead to uncomfortable pauses in the buying experience. Of course, if there are any issues this small delay will turn into a big delay and the one-click experience is marred.

Because of this combination of factors, 1 click to pay may be difficult without specialized hardware, like a registered smartphone, biometric reader or NFC touch, or by adding additional risk, or by simply pushing the complexity up front, before the purchase is made (that is the user may lock in his shipping info, agree to take a risk, agree to pay for mistakes, and so forth).

However, using the method described herein, and under a restricted, but still valuable set of cases it is possible to offer a beneficial one-click system.

Shipping information or physical location may not be required in the case of digital or Internet only objects or services. Nor is payment information always required. For instance, it is not required when a payment method has been preselected, or when no payment method is necessary at the moment of purchase, either because the user is using 'credit' or because the user is in a free trial, or the content or service is available by a free trial. For instance, by offering a user new to the service a small amount to sign up for the one-click service, the user can then immediately enjoy one-click, and only later, after he has proven to himself that it works, do they need to 'fund' continued use of the one-click service.

To ensure that the transaction is not subject to money laundering or to enforce other currency laws, a 'digital virtual currency' may be used. That virtual currency may be restricted from being used as a true currency through a variety of methods. For example, the virtual currency may not be allowed to be used to purchase physical goods, or transfer money, or it may only be used to purchase certain Internet services, or the volume of payments with it is strictly limited. The virtual currency may be used when the services or objects purchased are virtual, digital or otherwise have little or no intrinsic value. For instance, any object or service that is given away in return for watching ads, filling in surveys, or simply logging in is an excellent candidate to be offered via a possibly erroneous one-click. Another category is objects or services that typically only require proof of identity. This is analogous to the ability to borrow a towel at a pool by giving the pool your driver's license. Many sites do not give their content or services to anonymous users, or even non-anonymous users if the site lacks the ability to contact or track that user, but the site is willing to give that same content or services to people they can 'upsell' later. These sites require logins, CAPTCHAs, or even verification of contact info (like a working email address). In order for these sites to remove these hindrances an alternate, ideally quicker or more profitable alternative may be used.

To solve the login problem, the system 300 may use any of a variety of login methods. Of course, the user may be required to login. However, if the user has already logged into Google or Facebook or other identify service the system 300 may, by connecting to that service, reuse that login and not require yet another login.

If the user is not otherwise known and must login, system 300 may minimize the number of repeat logins by asking the user if he is on a secure computer, that is one where they do not need to log out automatically, and only if they answer yes, will that computer be authorized for one-click use.

To solve the user mistake issue, the system 300 may log all transactions and allow the user to view that log at any time and to mark mistakes with a period of time, say 30 days. Of course, this opens the possibility up of user fraud. To reduce this, the system 300 may limit the amount the user can spend, and may also monitor the amount of 'mistakes' a user claims and limit these to a reasonable amount, say 10% of all transactions.

To solve the website mistake or malicious website issue, the system 300 may reuse the same technique of logging and deferring payments. If a pattern of abuse is detected, either by a user or a website, that user or website may be warned, penalized (for example, by a 30-day block on use) or 'kicked off' the 1-click service.

To minimize the issue of lack of feedback, the system 300 may play a payment animation and or sound effects to highlight the effect of the single click.

Additionally, the system 300 may employ a method to circumvent the problem of a requiring a real payment option to already be active to enable one-click purchases. This method is to allow a limited amount of payment in a trial or test mode, specifically offering users who have validated their identify (say by giving the Coin service a valid email address or phone number) but not yet completed entering their payment information to be given a small 'trial' or 'test' amount of spendable currency, or a small credit limit. Once this trial amount or credit limit was reached, users would have to, at that later point, enter their payment information, or to perform some service to allow them to get more credit. This allows users to 'test' the service before they commit to entering their payment information. In the case of giving users a 'trial' amount, in order to minimize the cost to the payment provider this cost could be shared between the payment provider and the merchants using the payment service. One method of sharing this cost would be to later rebate the merchants for any lost revenues due to poor credit or valueless 'test' currency though sharing revenues of later purchases.

In other embodiments, the users may be granted a refund, if they cancel within the post purchase 'trial period', or in the case of pre-orders, post fulfillment trial period. When the payment is refunded, the entitlements associated with the payment may be revoked. For instance, the NY Times may allow non-subscribers to read an article for $0.25, but offer a satisfaction guarantee if they cancel within 1 minute. That is, the non-subscribers may click a cancel or coin return button or key within 60 seconds of the article's display and get their $0.25 back, in which case they will also lose the entitlement to read that page.

Each object or service that may be purchased with the digital currency may be given a unique ID and a price 'tag' which is used to determine the price. A price tag may simply be the price, or an indirect price marker. An example of an indirect price marker would be marking an article 'regular price' which might mean different things for different countries ($0.25 for USA, $0.30 Canada), or levels of subscribers (free for subscribers, $0.25 for non-subscribers).

For every purchase, at least two data base entries may be stored, a refund amount (typically based on the cost) and an ID of the purchased entitlement. Additionally, a third entry may be stored—refund expiration time. In some embodiments, refunds may be issued in the virtual currency instead of public currency, even if the purchase was made with public currency. In addition, refunds might have deducted from the purchase price some restocking or cancellation fee.

Figure 6:
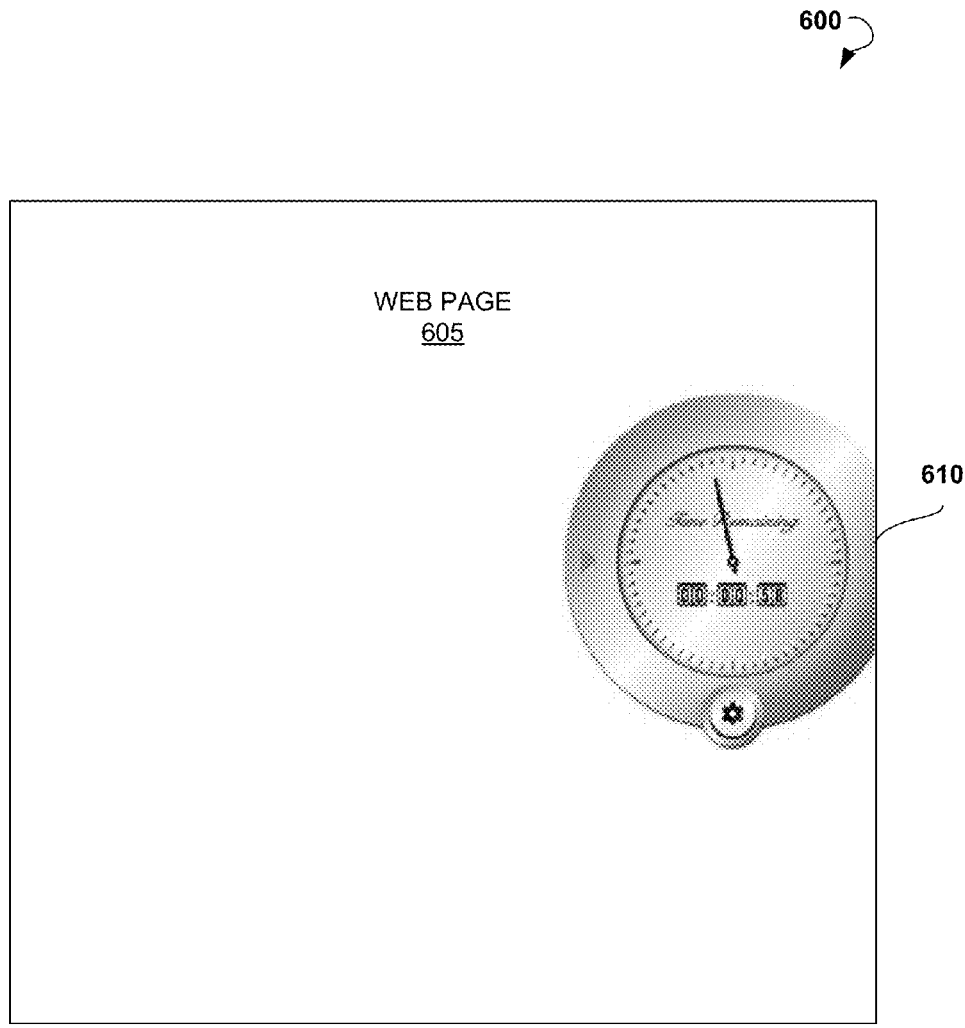
FIG. 6 illustrates an example visual indicator, in accordance with some example embodiments.

Additionally, a visual indicator, often a timer or clock, or audible or haptic signal may be used to indicate the amount of time left to claim a refund. An example visual indicator is illustrated by FIG. 6. An indicator 610 located in a web page 605 shows the time left till the end of the refund time. When the refund time ends, a signal to indicate the end may be produced.

The system for processing an online payment transaction may also track refunds to prevent users from repeatedly purchasing a minute of time or a page, claiming a refund, then purchasing another minute of time or another page, and again claiming a refund, repeatedly.

In some embodiments, when entitlements are cancelled, the coins are returned to the user in a manner simulating the coin return mechanism of a vending machine, the list of purchases is updated, and the list of returns is updated.

Additionally, undesirable behavior (for instance, a user or account that returns all purchases, or more than 20% of all purchases) may be supervised and the user may be warned that he violates the terms of service, or the buyer may be banned (for a specific time period, or until some penalty is paid) from the service.

In some embodiments, the system for processing an online payment transaction may enable 0-click payments.

In the system described herein the user could be navigating real or virtual space (aka a browser or application connected to the Internet). On an attempt to access paid content or service, that is as he reaches a point where money needs to be collected to continue, for example, to watch a movie, listen to a particular song, read a newspaper article or book or access a proprietary database (such as a medical database), play a game, or open a magic chest, join an event, the user may not be asked to stop and confirm his desire to proceed, before allowed to consume the non-free content or service. He may be simply allowed to proceed.

When the user crosses from a free action or zone to a pay action or zone he may be warned that he has begun using a non-free service, either through an audio prompt (voice or sound effect), visible message ("this movie will cost $3 per hour"), haptic feedback, color change, and so forth. In some embodiments, the buyer may customize how this warning is offered to him. The user may even be given the option of manual confirmation of some or all purchases (which might be ordinarily available without confirmation using 0-click), or purchases over a set amount. This confirmation could be quite simple, for instance "say or click CONFIRM to continue."

Prior to activating a 0-click mode, the user may have to authenticate him with the payment service. This could be done with a password, security chip or dongle, fingerprint, voiceprint, or other biometric identification, location of a locatable object like a smart phone, or some combination of authentication methods.

In some embodiments, the user may be asked to associate a digital wallet with his 0-click account, or put some money into a virtual wallet that is associated with his 0-click account. The user also may be asked to associate a specific form of payment with his virtual wallet. The form of payment may include a debit or credit card, stored value card, bank account, loan agreement, and so forth. If at any time the associated payment becomes invalid, the user may be asked to again associate a form of payment, or be limited to the remaining funds in his virtual wallet.

Figure 7:
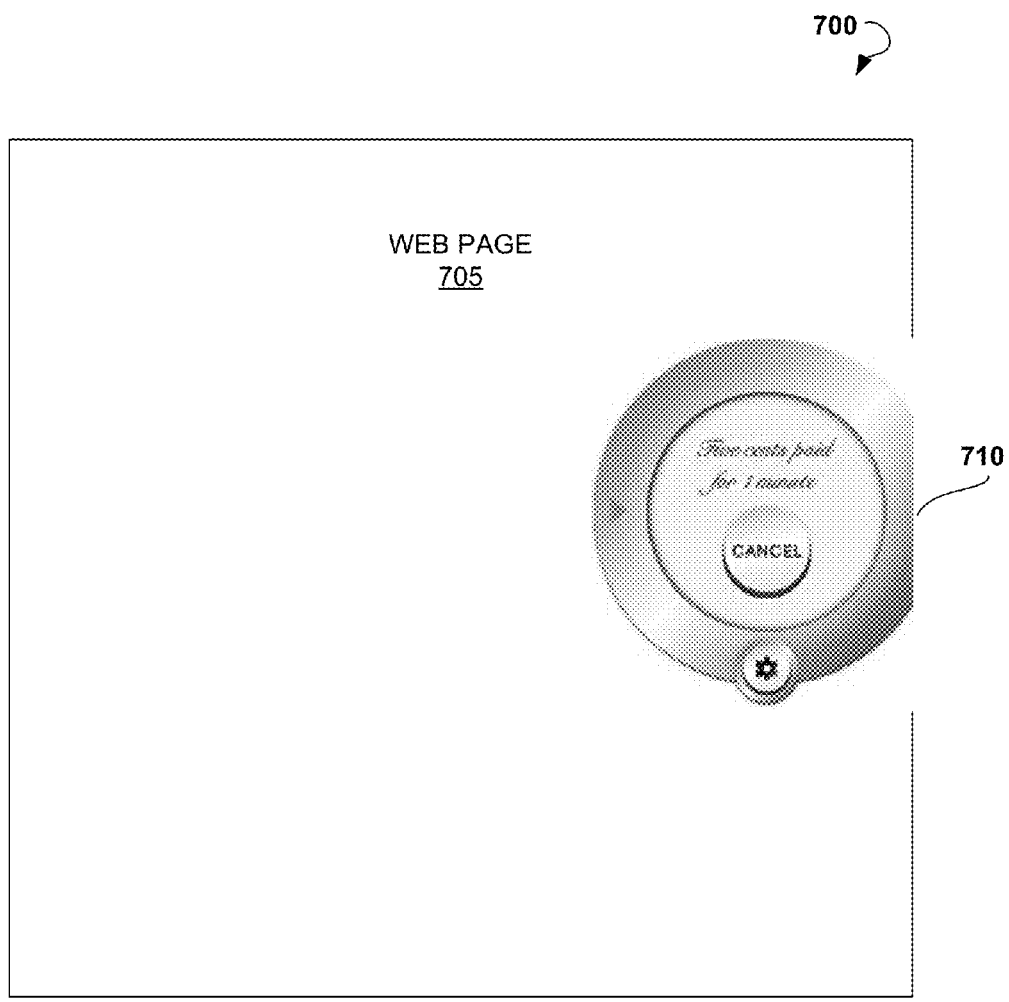
FIG. 7 illustrates another example visual indicator, in accordance with some example embodiments.

Once the paid service has begun, the user may be presented with an interface informing him about the cost of the service visually, audibly, via a haptic interface, and so forth. An example interface is illustrated in FIG. 7. Thus, an interface 710 located in a web page 705 includes the cost of the paid service and a cancel button. On clicking the cancel button, a payment request for the paid service may be cancelled, and the entitlement purchased by the payment be revoked. Optionally, interface 710 may include the amount of money remaining in the 0-click account.

The 0-click mode is particularly well suited to paying for incrementally priced content or service. For instance 0-click could be used to simplify paying for time (say $1 for 5 minutes) like a parking meter, access to a commuter lane, listening to audio or watching a video, play time for a game, skipping wait time, skipping ads for some time, or even time to access proprietary data or text. With 0-click, a payment may be automatically deducted as time passes, since, in contrast to traditional payment mechanisms, confirmations are not required with each purchase. The 0-click mode may also simplify paying by word, page, chapter, episode, and so forth. With 0-click, a payment may be automatically deducted at each increment. Unlike traditional payment mechanisms however, the user does not need to be interrupted as each additional payment is accrued.

The interface 710 may vary depending on the type of payment associated with the online product or service. For example, if the user is paying for time (say $0.01 per minute to listen to music or watch a TV show) he may be presented with a regular reminder of cost (say a $0.10 reminder every 10 minutes, or a running total say $0.72 for 72 minutes). Alternatively, time may be purchased in discrete chunks, for example, 10 minutes for $1. In this case, the buyer may be presented with a visible or audible representation of the most recent expenditure and the time remaining. If the buyer pays by unit, for example, a page, the system for processing an online payment transaction may present the user the costs each time a page is purchased (say $0.01 per page), or may present a running total of pages purchased (say $0.72 for 72 pages) or a reminder that the next page or chapter will cost a certain amount, so that the buyer does not inadvertently click on dozens or hundreds of pages without realizing there is a cost to each one.

If the user initiates additional spending and the user has run out of money (or credit) in their 0-click account then the system may prompt the user to restock their 0-click account, or connect their 0-click account to another payment system for automatic restocking. Alternatively, the account could be automatically restocked once it hits a minimum balance, say $10, or the user could be asked to manually restock his/her account once it drops below a preset minimum balance. In other embodiments, the system for processing an online payment transaction may enable 0-click purchases.

In a conventional commerce system, users choose what they want to purchase, then initiate a form of payment by handing over cash, a credit, debit or prepaid card, touching a near field communication 'pad', running an application on their mobile device in which they use voice or a click to confirm the purchase, or potentially by registering for a '1 click purchase' and then pushing the 'buy' or '1 click' button. These traditional payment mechanisms are collectively termed 'click to buy'.

However, even the best of these payment mechanisms interrupt the experience, and, depending on implementation, cause varying degrees of annoyance and inefficiency. As the purchase amounts become smaller and/or more frequent the effort to make a purchase becomes an increasingly burdensome process relative to the value of the purchase.

Prior to 'turning on' 0-click the user may authenticate with the 0-click service. This could be done with a password, security chip or dongle, fingerprint, voiceprint, or other biometric identification, location of a locatable object like a smart phone, or some combination of authentication methods.

Once the pay object or service has begun, the user may be presented with an interface (visually, audibly, via a haptic interface, etc.) including the cost of the object or service, and may also be presented with the amount of money they have remaining in their 0-click account. However, unlike traditional systems, the user may not have to further confirm the purchase, he simply continues, and can cancel if he wishes.

Typically, each time the user spends money, the system 300 may present to the user what they just spent, and where appropriate (that is when it is not obvious), what they just purchased. This is to minimize the chance of price shock. The presentation could be as simple a beep or click to mark the passage of time (when paying for time), or literally show coins moving from the user's wallet into a slot, or a simple visual, audible or haptic prompt, for example "Page 111. Cost $0.02" or "$0.01 per minute" or "$0.01 per page". These prompts may overlap the content or be placed outside the content.

Additionally, the user may cancel or negate or reverse navigation into a pay area that is 0-click enabled and active (that is charges accrue in this area) to avoid those charges. This may be implemented by providing the user a grace or refund period, perhaps as short as 30 seconds. The grace period may be set by the merchant, within parameters determined by the 0-click service. During the grace period, the user, in addition to normal interfaces may be also presented with a cancel interface. The cancel interface may include a cancel, refund or stop key or button to flick, press or click on, or coin return lever to press, or the ability to say 'cancel' or 'stop', or the ability via haptic feedback (say roughly shaking your mobile phone) to cancel the purchase. Using a camera, a user shaking his head may be used to cancel.

If the user cancels within the grace period, a refund for any cancelled purchase may be immediately provided to the user. Streamlining the cancel process is important to give the user a sense of safety, that is, they may do whatever he want, and if he ends up accidentally spending money, or spending money on something not satisfactory, he may instantly get a refund.

In an example implementation, the user may be only allowed to cancel a limited number of 0-click purchases, perhaps, the most recent or two 0-click purchases. The intention is to be fair to both consumer and merchant. It would not be fair for a user to watch 2 hours of a 2 hour and 5 minute movie a request a full refund, but it would be fair to let them watch the first 5 minutes of that movie and still get a full refund if he is not satisfied. Likewise it would not be fair for a user to read 200 pages of a 210 page novel and then request a full refund, but it would be fair to let them read a page or even a chapter and then cancel.

In some embodiments, the merchant offering goods or services via 0-click may break those goods or services into smaller, easily reversible or cancel-able parts, for example, 5 minutes of a movie, or a chapter of a book, and then to allow the user to get a full refund of just the most recent part. To facilitate this division, the 0-click service may offer to track these small incremental purchases.

To prevent the user from reading a page, cancelling the charge, then reading page 2, cancelling the charge for page 2, it will be common to prevent the user either from proceeding to the second part without paying for the first, or inform (and 0-click pay) or ask the user (to non 0-click pay) to make a non-refundable purchase of any skipped or previously cancelled parts when they try to continue.

In addition, the system 300 may monitor all users, all merchants, and the system itself for fraudulent behavior. The system 300 may monitor users for an unusually high percent of returns or cancelations, and potentially warn them of their undesirable behavior, and perhaps either ban them or turn off (at least temporarily) their ability to purchase via 0-click or easily cancel charges. These changes may be accompanied by appropriate messages or equivalent interface elements to the user. Likewise, merchants who generate a unusually high percent of user complaints (either directly on the 0-click system interface, of as collected through internet messages, emails, phone calls, etc.) may also be warned, monitored more carefully, and in the worst case fined, banned or sued by the 0-click service provider.

In some embodiments, every transaction pushed through the 0-click system would be logged or recorded. The recorded information may include IP addresses, device type and ID, time, entitlement ID, URL or name of good or service purchased, identity (perhaps anonymized) of user, merchant ID, price, and so forth.

If a user cancels a transaction either the 0-click system may notify the merchant of the cancelation, or the merchant may notify the system. The cancelation typically immediately withdraws the previously purchased entitlement and may change the interface accordingly. If the user cancels a purchase or an entitlement, the system may confirm to the user that the cancelation has taken place. This may be done with an appropriate message, visual or audio feedback; otherwise the reason that the entitlement has been cancelled and the interface changed might be mysterious. Also the user who just cancelled may be allowed to un-cancel the purchase, as this or any other user action might be accidental.

Once goods or services are cancelled, to prevent users from inadvertently repurchasing (automatically) those same goods or services with 0-click, in the typical implementation the system or the merchant may turn off '0-click' from that location (URL or physical), good or service, at least for that session. Users may then have to manually indicate either the desire to purchase or to reestablish 0-click for that object or service. Remembering the state of 0-click or auto-purchase typically will require storing each completed or cancelled purchase of an object, service or location in a database, so that when the user returns to that thing (or simply stays on that thing) the system does not automatically repurchase it if previously cancelled or previously purchased.

Alternatively some things must be repurchased or re-cancelled on each use. In these cases there may be no need to store for the long term these temporary purchases or cancels.

Where 0-click has been turned off, either by merchant or user preference or choice, an indicator that 0-click is off may be displayed and an interface to manually over-ride or turn on 0-click may be presented. In the case where 0-click is on (by both merchant and user preference) an indicator of 0-click on may be displayed and an interface to manually override or turn off 0-click may be presented.

Merchants may also make their entire 'application', 'store' or 'site' or particular goods or services default to 0-click off, and ask the user to enable 0-click, or make their entire site default to 0-click on and ask the users to disable it as they desire. Similarly users may default that 0-click would be off (or on) for all or some merchants, or all or some goods or services from those merchants, and have to enable (or disable) them though an interface or API (application programming interface).

In an example embodiment, a user may mark a site or application as a non-0-click (0-click off) by holding down on the (0-click) cancel button until its state changes from a cancel button to an enable 0-click button. Then for the user to re-enable 0-click that user would simply have to click the enable 0-click button. In another implementation when a user logged into or entered a 0-click merchant, site or application he could add or remove the check against the 0-click purchase option, or saying '0-click on' or '0-click off'. In another implementation the user could have to prime the 0-click system of a merchant by placing a coin into a coin slot, by clicking on 'enable 0-click' which could be text or iconic or otherwise enabling 0-click. Users could have in their system profile whether they wanted 0-click enabled by default on a new site or application or not. They could also choose to enable 0-click by default based on system recommendations.

We also claim certain particular uses of 0-click. 0-click could be used to watch TV, movies or internet video, to listen to music or other audio, to play games, to read, to access proprietary databases, like credit reports, to access any number of internet services, to remove or reduce ads from ad-supported goods or services, to allow access to content or services that otherwise would require log-in, verification, subscription or membership, and so forth.

In order to not scare off users from the potentially large number of incremental payments, merchants may enable maximum individual, daily, weekly, monthly, yearly (or some other time interval) payments, or maximum payments for a good or service. For example, if reading a page costs $0.05 and reading an entire book costs $10, the merchant may choose that reading page by page will not generate more than $10 in charges (or perhaps a higher amount if they want to charge a premium on incrementally reading a book). Similarly if the Tuesday New York Times costs $2.50 and reading a single article costs $0.25 then the maximum payment for that Tuesday paper may be $2.50 or $5. Similarly if the NY Times annual subscription costs $300, then any incremental cost of reading by the page or paper is limited to $300 or $400 per year. Similar implementations could cover payment towards 'owning' a TV series, a sports season, or a computer game. If payment is advancing towards a maximum threshold then the system or merchant may choose to display progress towards that goal. For example "You have spent $95. You are now within $5 of purchasing full access. Click here to purchase full access."

Similarly users may wish to limit their individual, hourly, daily, weekly or monthly spending, especially for children, and either simply halt payments when their self-imposed cap is exceeded, or require an additional warning or manual confirmation of any purchases past that limit. The system may include interfaces to set merchant, service, and/or user limits.

0-click Purchases can also be used for purchasing in the real (or virtual) world. Just as with 0-click we can charge people when they navigate into premium areas, by carrying a 0-click enabled device users could automatically be charged when moving into premium areas such as a movie, concert, sports or other event and be automatically charged if they stay at the event beyond a minimum duration, or even be charged differentially by what location they stayed in; fancy seats would cost more than bad seats. They could be charged for using high speed lanes, using trains or buses, using parks or paid parking, going to pay locations like theme parks, sports facilities, or other locations or facilities. As the use of 0-click on the Internet or within a virtual world, use of 0-click in the real world would be accompanied by audible, visual or haptic feedback, most likely through some mobile device. It also could be used to track and pay for time and distance based services like riding in a hired car or cab.

Another variant of 0-click may be to allow the user to skip commercial messages. The user may simply indicate his desire to skip one, all or certain types of commercial messages, for instance, by saying, clicking or pressing on 'skip', 'skill all' or 'skip here' and the ads would be skipped. Alternatively, the user could use a wipe gesture to wipe away the ads, or a long press or long click on an ad would bring up the ad removal preference UI. Like other forms of 0-click the system 300 might indicate to the 0-click user that a charge has occurred and may remind or present to the user how to cancel the ad-removal action to avoid the ad-removal charge.

A variant of 0-click could be used to register physical or digital purchases. Instead of the user navigating into a premium area of the Internet, the physical or digital object to be purchased could be moved into a real or virtual bag, box or location that indicates the change in ownership. For instance, moving an electronic device, or object with a tracking tag from the store to the user home, car, purse, backpack or wallet would indicate change in ownership, at which point the user would be charged for that object. The object may be tracked by visual recognition, for instance by scanning a bar code, or by an RFID tag on the object's package, or other methods. Unlike the typical point of purchase system, the feedback on the purchase would, in real time, be presented on the user's mobile device, and as with other 0-click purchases, the user would be given an opportunity to cancel the purchase either by moving the object into a real or virtual cancel 'bin', or by indicating cancel on the mobile device.

Figure 8:
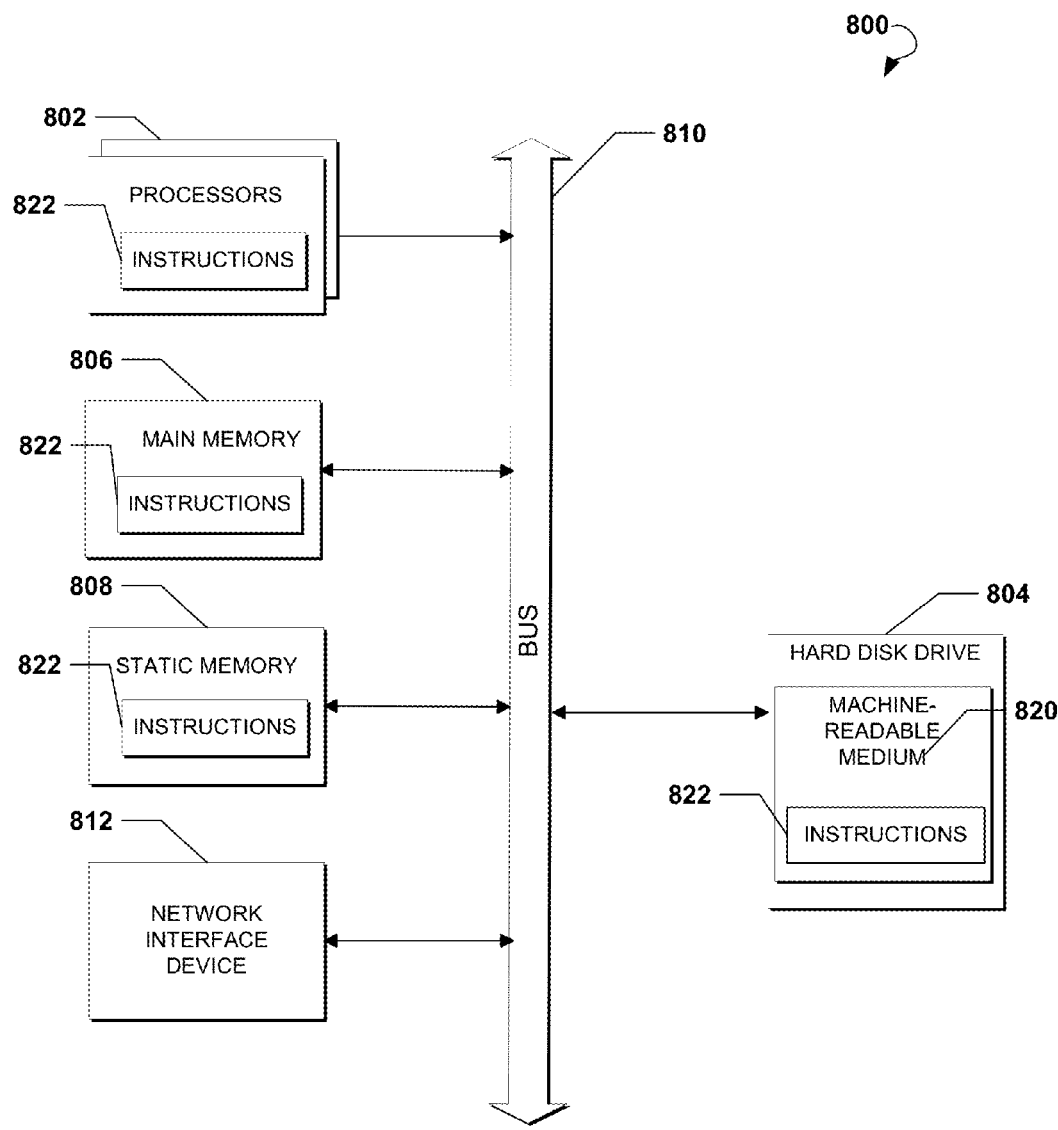
FIG. 8 shows a diagrammatic representation of a computing device for a machine in the exemplary electronic form of a computer system, within which a set of instructions for causing the machine to perform any one or more of the methodologies discussed herein, can be executed.

FIG. 8 is a diagrammatic representation of an example machine 800 in the form of a computer system within which a set of instructions for causing the machine to perform any one or more of the methodologies discussed herein is executed. In various example embodiments, the machine operates as a standalone device or may be connected (e.g., networked) to other machines. The machine may include its own internal database or be connected to an external database in order to provide substantially real time updates. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 800 includes a processor or multiple processors 802 (e.g., a central processing unit (CPU), a graphics processing unit (GPU), or both), a main memory 808, and a static memory 814, which communicate with each other via a bus 828. The computer system 800 may further include a video display unit 806 (e.g., a liquid crystal display (LCD)). The computer system 800 may also include an alphanumeric input device 812 (e.g., a keyboard), a cursor control device 816 (e.g., a mouse), a voice recognition or biometric verification unit (not shown), a disk drive unit 820, a signal generation device 826 (e.g., a speaker), and a network interface device 818. The machine 800 may further include a data encryption module (not shown) to encrypt data.

The disk drive unit 820 includes a computer-readable medium 822 on which is stored one or more sets of instructions and data structures (e.g., instructions 810) embodying or utilizing any one or more of the methodologies or functions described herein. The instructions 810 may also reside, completely or at least partially, within the main memory 808 and/or within the processors 802 during execution thereof by the machine 800. The main memory 808 and the processors 802 may also constitute machine-readable media.

The instructions 810 may further be transmitted or received over a network 824 via the network interface device 818 utilizing any one of a number of well-known transfer protocols (e.g., Hyper Text Transfer Protocol (HTTP)).

While the computer-readable medium 822 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Thus, a system and method for processing of online payment transactions have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for processing of online payment transactions, the method comprising:
   registering a merchant with a payment service to create a first account, wherein the payment service is associated with a digital currency;
   registering a user with the payment service to create a second account;
   providing to the merchant, an entitlement identifier associated with an entitlement, the entitlement identifier embedded in a web resource associated with the entitlement, the entitlement being associated with a Uniform Resource Locator (URL);
   receiving, from the user, a payment request associated with the entitlement, the payment request including the entitlement identifier and a payment amount, the payment request received in response to activation of a digital coin associated with content of the merchant, the digital coin represented by a graphical user interface (GUI), the activation of the digital coin accompanied by one or more of the following events: an audio, an animated graphics, an animated video, a haptic feedback;
   ascertaining whether the payment service contains the entitlement identifier;
   based on the ascertaining, selectively requesting that the merchant registers the entitlement;
   querying a database to validate that the entitlement identifier is associated with the entitlement;
   based on the validating, crediting the second account with the payment amount;
   transferring the payment amount from the second account associated with the user to the first account associated with the merchant;
   representing the transfer of payment amount via the GUI, the GUI providing audio, animated graphics, or video, the GUI further providing feedback in response to the payment amount, the feedback corresponding to payment amount size;
   monitoring activity of the user, by logging payment history of the user;
   presenting a warning to the user if a pattern of abuse is detected, the warning accompanied by an equivalent interface element to the user;
   querying an identity service to check if the user is allowed access to content, which provides the user a privilege to remain anonymous; and
   controlling access to the content in real-time by processing the payment request and the querying of the identity service.

2. The method of claim 1, wherein the activation of the digital coin is in response to one or more of the following actions: touching, pinching, clicking, flicking, dragging, and dropping.

3. The method of claim 1, wherein the entitlement is associated with a file name or other identifying characteristic of the entitlement.

4. The method of claim 1, wherein the payment is configured to facilitate one or more of the following actions: remove a banner ad from a website; read, wholly or partly, a newspaper, a magazine, or a book; skip a commercial; donate to a cause; unlock an item in an online game; access a service or additional feature; access a paywalled content; listen, wholly or partly, an audio track; view, wholly or partly, a video; trigger an event; access a digital object; write a comment; write an annotation; send a message to an author; send a copy to a contact; get early access; vote for or improve ranking of a digital object; mark a favorite object; save a digital object; get access to additional information.

5. The method of claim 1, wherein the entitlement identifier is embedded in one or more of the following: the content, a container of the content, data identifying the entitlement, a web page, a browser toolbar, an application, a piece of digital content, a digital movie, a digital document, a database, and a content management system.

6. The method of claim 1, wherein the user is anonymous and identified by a unique user identifier.

7. The method of claim 6, further comprising:
   providing the unique user identifier to an identity service; and
   receiving user data from the identity service.

8. The method of claim 1, further comprising:
   ascertaining whether the user is registered with the payment service; and
   selectively registering the user with the payment service.

9. The method of claim 1, wherein the registering of the merchant with the payment service includes providing bank account or other payment data.

10. The method of claim 1, wherein the registering of the merchant includes proving ownership of the content.

11. The method of claim 1, further comprising deducting the service fee from the second account associated with the user or the first account associated with the merchant.

12. A system for processing of online payment transactions, the system comprising:
a processor configurable to:
register a merchant with a payment service to create a first account, wherein the payment service is associated with a digital currency;
register a user with the payment service to create a second account;
provide, to the merchant, an entitlement identifier associated with an entitlement, the entitlement identifier embedded in a web resource associated with the entitlement, the entitlement being associated with a Uniform Resource Locator (URL);
receive, from the user, a payment request associated with the entitlement, the payment request including the entitlement identifier and a payment amount, the payment request received in response to activation of a digital coin associated with content of the merchant, the digital coin represented by a graphical user interface (GUI), the activation of the digital coin accompanied by one or more of the following events: an audio, an animated graphics, an animated video, a haptic feedback;
ascertain whether the payment service contains the entitlement identifier;
based on the ascertaining, selectively request that the merchant registers the entitlement;
query a database to validate that the entitlement identifier is associated with the entitlement;
based on the validating, credit the second account with the payment amount;
transfer the payment amount from the second account associated with the user to the first account associated with the merchant;
represent the transfer of payment amount via the GUI, the GUI providing audio, animated graphics, or video, the GUI further providing feedback in response to the payment amount, the feedback corresponding to payment amount size;
monitor activity of the user, by logging payment history of the user; and
present a warning to the user if a pattern of abuse is detected, the warning accompanied by an equivalent interface element to the user;
a database configurable to store information associated with the merchant, the first account, the user, the second account, and the entitlement;
querying an identity service to check if the user is allowed access to content, which provides the user a privilege to remain anonymous; and
controlling access to the content in real-time by processing the payment request and the querying of the identity service.

13. The system of claim 12, wherein the activation of the digital coin is in response to one or more of the following actions: touching, pinching, clicking, flicking, dragging and dropping.

14. The system of claim 12, wherein the entitlement is associated with a file name or another identifying characteristic.

15. The system of claim 12, wherein the payment is configured to facilitate one or more of the following actions: remove a banner ad from a website; read, wholly or partly, a newspaper, a magazine, or a book; skip a commercial; donate to a cause; unlock an item in an online game; access a service or additional feature; access a paywalled content; listen, wholly or partly, an audio track; view, wholly or partly, a video; trigger an event; access a digital object; write a comment; write an annotation; send a message to an author; send a copy to a contact; get early access; vote for or improve ranking of a digital object; mark a favorite object; save a digital object; get access to additional information.

16. A non-transitory computer-readable medium comprising instructions, which when executed by one or more processors, perform the following operations:
register a merchant with a payment service to create a merchant account, wherein the payment service is associated with a digital currency;
register a user with the payment service to create a user account;
provide, to the merchant, an entitlement identifier associated with an entitlement, the entitlement identifier embedded in a web resource associated with the entitlement, the entitlement being associated with a Uniform Resource Locator (URL);
receive, from a user, a payment request associated with the entitlement, the payment request including the entitlement identifier and a payment amount, the payment request received in response to activation of a digital coin associated with content of the merchant, the digital coin represented by a graphical user interface (GUI), the activation of the digital coin accompanied by one or more of the following events: an audio, an animated graphics, an animated video, a haptic feedback;
ascertain whether the payment service contains the entitlement identifier;
based on the ascertaining, selectively request that the merchant registers the entitlement;
query a database to validate that the entitlement identifier is associated with the entitlement and price;
based on the validating, credit the user account with the price;
transfer the payment amount from the user account to the merchant account;
represent the transfer of payment amount via the GUI, the GUI providing audio, animated graphics, or video, the GUI further providing feedback in response to the payment amount, the feedback corresponding to payment amount size;
monitor activity of the user, by logging payment history of the user;
presenting a warning to the user if a pattern of abuse is detected, the warning accompanied by an equivalent interface element to the user;
querying an identity service to check if the user is allowed access to content, which provides the user a privilege to remain anonymous; and
controlling access to the content in real-time by processing the payment request and the querying of the identity service.

* * * * *